United States Patent
Uchida (10) Patent No.: US 12,099,824 B2
(45) Date of Patent: *Sep. 24, 2024

(54) ELECTRIC DEVICE AND METHOD FOR CONTROLLING SAME

(71) Applicant: TOSHIBA TEC KABUSHIKI KAISHA, Tokyo (JP)

(72) Inventor: Shigeo Uchida, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/350,929

(22) Filed: Jul. 12, 2023

(65) Prior Publication Data

US 2023/0350660 A1    Nov. 2, 2023

Related U.S. Application Data

(63) Continuation of application No. 17/665,423, filed on Feb. 4, 2022, now Pat. No. 11,755,304.

(51) Int. Cl.

| G06F 15/16 | (2006.01) |
| G06F 3/04842 | (2022.01) |
| G06F 8/61 | (2018.01) |
| H04L 67/00 | (2022.01) |

(52) U.S. Cl.
CPC ............ *G06F 8/61* (2013.01); *G06F 3/04842* (2013.01); *H04L 67/34* (2013.01)

(58) Field of Classification Search
None
See application file for complete search history.

(56) References Cited

U.S. PATENT DOCUMENTS

| 7,761,811 B1* | 7/2010 | Chaudhri .................. G06F 8/61 |
| | | 715/810 |
| 9,690,933 B1 | 6/2017 | Singh et al. |
| 10,303,460 B2 | 5/2019 | Fox |

(Continued)

FOREIGN PATENT DOCUMENTS

| JP | 2010-015533 A | 1/2010 |
| JP | 2011-248488 A | 12/2011 |

OTHER PUBLICATIONS

Non-Final Office Action on U.S. Appl. No. 17/665,423 dtd Nov. 10, 2022.

(Continued)

*Primary Examiner* — Phuoc H Nguyen
(74) *Attorney, Agent, or Firm* — Foley & Lardner LLP (57) ABSTRACT

A device includes a memory and a processor. The processor is configured to download a plurality of installation files for different application programs provided on a website at a predetermined download timing, store the plurality of installation files in the memory, recommend, to a user, a function added by installing an application program based on the plurality of installation files stored in the first storage unit at a predetermined recommendation timing that is a different timing from the download timing, and install a respective application program using a respective installation file selected from among the plurality of installation files stored in the first storage unit in response to an instruction from the user based on the recommendation.

20 Claims, 4 Drawing Sheets

(56) References Cited

U.S. PATENT DOCUMENTS

| | | |
|---|---|---|
| 10,868,927 B1 | 12/2020 | Kodimer |
| 11,269,618 B1* | 3/2022 | Webster ................ G06F 3/0484 |
| 2006/0031400 A1* | 2/2006 | Yuh .................... H04N 21/4622 |
| | | 709/218 |
| 2008/0177994 A1 | 7/2008 | Mayer |
| 2009/0241107 A1 | 9/2009 | Kobayashi |
| 2011/0296439 A1 | 12/2011 | Kozaki |
| 2012/0078917 A1 | 3/2012 | Gradin et al. |
| 2013/0326499 A1 | 12/2013 | Mowatt et al. |
| 2014/0223423 A1* | 8/2014 | Alsina .................... H04L 67/34 |
| | | 717/173 |
| 2016/0321060 A1* | 11/2016 | Sankaranarasimhan ..................... |
| | | G06F 8/36 |
| 2017/0076235 A1 | 3/2017 | Noto et al. |
| 2018/0054130 A1 | 2/2018 | Moon et al. |
| 2018/0081659 A1* | 3/2018 | DuBois .................. G06F 9/485 |
| 2018/0113699 A1* | 4/2018 | Hunter ................ H04N 21/478 |
| 2018/0124544 A1* | 5/2018 | Gupta .................. H04L 41/082 |
| 2020/0012488 A1 | 1/2020 | Koval et al. |
| 2020/0379744 A1 | 12/2020 | Bhupati et al. |
| 2021/0081486 A1 | 3/2021 | Mattox et al. |
| 2022/0014603 A1 | 1/2022 | Cameron |
| 2022/0104822 A1 | 4/2022 | Shelton et al. |

OTHER PUBLICATIONS

Notice of Allowance on U.S. Appl. No. 17/665,423 dtd Apr. 27, 2023.

* cited by examiner

ELECTRIC DEVICE AND METHOD FOR CONTROLLING SAME

CROSS-REFERENCE TO RELATED PATENT APPLICATION

This application is a continuation of U.S. patent application Ser. No. 17/665,423, filed Feb. 4, 2022, which is incorporated herein by reference in its entirety.

FIELD

Embodiments described herein relate to an electric device and a method for controlling the same.

BACKGROUND

It is currently possible to install an application program provided on a website to an image forming apparatus or an electric device such as a multifunction device to enable a change in the executable functions thereof. However, a user of the image forming apparatus has to access the website, select the function that he or she wants to add, and download an installation file corresponding to the function. In such a situation, with a control based on the application program, it is desirable to efficiently perform the installation of the application program to the electric device.

DETAILED DESCRIPTION

In general, according to one embodiment, there is provided an electric device including: a download unit, a first storage unit, a recommendation unit, and an installation unit. The download unit downloads a plurality of installation files for different application programs provided on a website at a predetermined download timing, respectively. The first storage unit stores the plurality of installation files downloaded by the download unit. The recommendation unit recommends a function added by installing an application program to a user at a predetermined recommendation timing that is a different timing from the download timing, based on the installation files stored in the first storage unit. The installation unit installs an application program using an installation file specified from among the plurality of installation files stored in the first storage unit, in response to an instruction from the user in response to a recommendation by the recommendation unit.

Hereinafter, an example of an embodiment will be described with reference to the drawings. In this embodiment, a multifunction device will be described as an example of the electric device.

Figure 1:
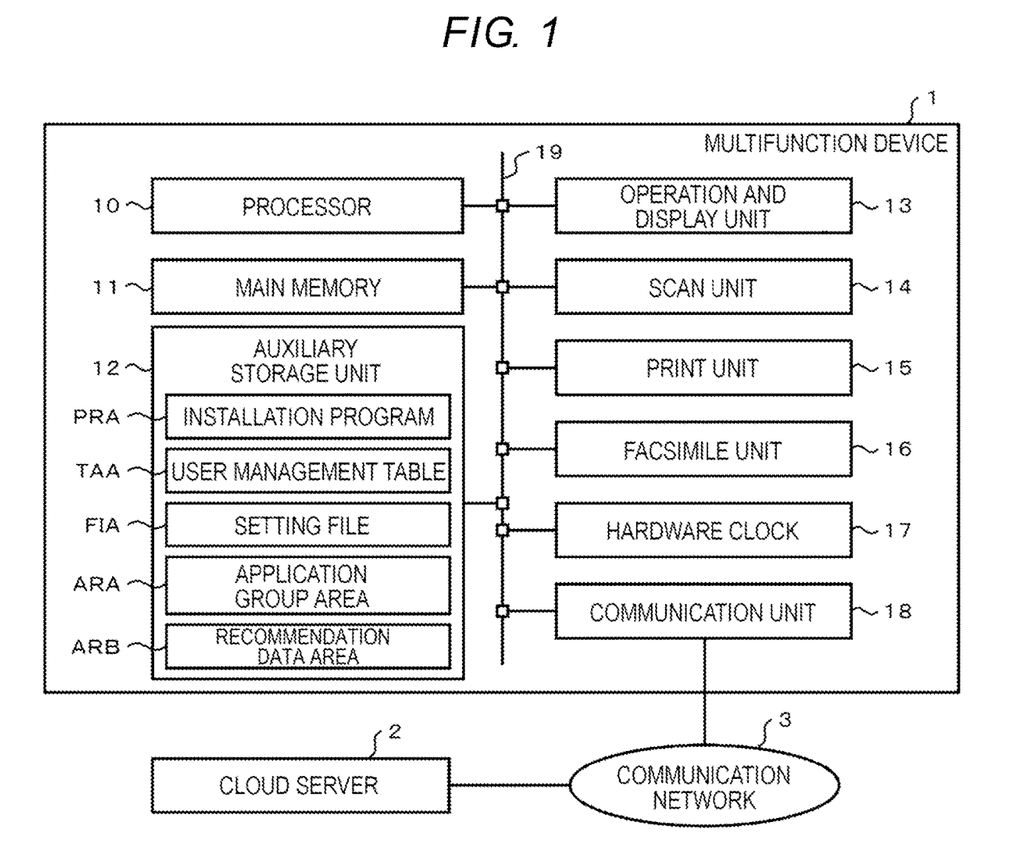
FIG. 1 is a block diagram illustrating a main circuit configuration of a multifunction device according to an embodiment.

FIG. 1 is a block diagram illustrating a main circuit configuration of a multifunction device 1 according to the present embodiment. The multifunction device 1 is a device (e.g., a multifunction peripheral) combining functions of a copier, a scanner, a printer, a facsimile machine, and the like. However, not all of these functions may be required, or another function may be added. The multifunction device 1 is often abbreviated as MFP.

The multifunction device 1 includes a processor 10, a main memory 11, an auxiliary memory or storage unit 12, an operation and display unit 13, a scan unit 14 (a scanner), a print unit 15 (a printer), a facsimile unit 16, a hardware clock 17, a communication unit 18 (a communications interface, a transceiver, etc.), a transmission line 19, and the like. The processor 10, the main memory 11, the auxiliary storage unit 12, the operation and display unit 13, the scan unit 14, the print unit 15, the facsimile unit 16, the hardware clock 17, and the communication unit 18 are connected to each other via the transmission line 19.

A computer to perform information processing is configured by connecting the processor 10, the main memory 11, and the auxiliary storage unit 12 to each other via the transmission line 19. The processor 10 corresponds to a central part of the computer. The processor 10 executes information processing according to an information processing program such as an operating system, middleware, an application program, and the like.

The main memory 11 corresponds to a main memory portion of the computer. The main memory 11 includes a non-volatile memory area and a volatile memory area. The main memory 11 stores the information processing program in the non-volatile memory area. Further, the main memory 11 may store data necessary for the processor 10 to execute the processes for controlling each part in the non-volatile or volatile memory area. The main memory 11 uses the volatile memory area as a work area in which data is appropriately rewritten by the processor 10.

The auxiliary storage unit 12 corresponds to an auxiliary storage portion of the computer. The auxiliary storage unit 12 can use, for example, well-known storage devices such as electric erasable programmable read-only memory (EEPROM), hard disk drive (HDD), solid state drive (SSD), and the like, alone or in combination of two or more. The auxiliary storage unit 12 stores data for use at the processor 10 to perform various processes, and data generated as a result of the processes at the processor 10. The auxiliary storage unit 12 stores the information processing program. One of the information processing programs stored in the auxiliary storage unit 12 is an installation program PRA. The installation program PRA describes a process for downloading and installing the application program provided on a website implemented by a cloud server 2 via a communication network 3, which will be described below. A part of a storage area of the auxiliary storage unit 12 is used to store a user management table TAA and a setting file FIA, which will be described below. Further, a part of the storage area of the auxiliary storage unit 12 is used as an application group area ARA and a recommendation data area ARB, which will be described below.

In addition, as the communication network 3, for example, the Internet, virtual private network (VPN), local area network (LAN), public communication network, mobile communication network, and the like may be used, alone or in combination as appropriate. The Internet is typically used as the communication network 3.

The operation and display unit 13 receives an operation by an operator and displays various information to the operator. The operation and display unit 13 may appropriately include various operation devices and display devices such as a touch panel, a keyboard, a key switch, a light emitting diode (LED) lamp, a liquid crystal display panel, or the like.

The scan unit 14 reads a document and generates image data of the image indicated on the document.

The print unit 15 prints the image indicated by the image data on a recording paper. The print unit 15 includes a well-known print device such as an electrophotographic image forming unit and the like, for example.

The facsimile unit 16 performs various well-known processes for performing image communication according to the facsimile standard via a communication network (not illustrated) such as a public switched telephone network (PSTN), and the like.

The hardware clock 17 constantly counts time and outputs date and time information. The hardware clock 17 may be replaced by a system clock managed by the operating system.

The communication unit 18 executes a communication process for performing data communication via the communication network 3. As the communication unit 18, for example, an existing communication device for the Internet may be used.

The transmission line 19 includes an address bus, a data bus, a control signal line, and the like, and transmits data and control signals transmitted and received between the connected units.

Figure 2:
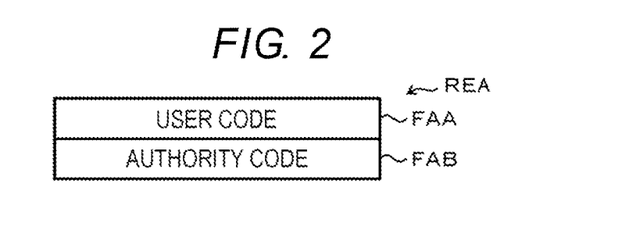
FIG. 2 is a diagram schematically illustrating one data structure of a data record included in a user management table illustrated in FIG. 1.

FIG. 2 is a diagram schematically illustrating one data structure of a data record REA included in the user management table TAA. The user management table TAA is a set of data records REA associated with a plurality of users who use the multifunction device 1, respectively. The data records REA include fields FAA and FAB. The field FAA is set with a user code as an identifier of an associated user. The field FAB is set with an authority code that indicates an authority to use various functions of the multifunction device 1. Any kind of authority may be given to each user. For example, the authority may include an authority to use all functions, an authority to use only the functions that do not use communication, an authority to use only the functions that are allowed by an administrator of the multifunction device 1, and the like. The authority code as an identifier is predetermined for the authority. The content of the authority and the authority code may be freely determined by a designer, an administrator, or the like of the multifunction device 1. That is, the user management table TAA corresponds to the authority data. An area of the auxiliary storage unit 12 that stores the user management table TAA corresponds to a third storage unit or a third memory.

The setting file FIA is a data file that indicates setting data for each of various setting items related to the operation of the multifunction device 1. One of the setting data indicated by the setting file FIA indicates whether the download mode is a first mode, a second mode, or a third mode. The first mode may be if a target of a batch download to be described below corresponds to all that is compatible with the multifunction device 1, among the application programs provided by the cloud server 2. The second mode may be if the target of the batch download corresponds to an application program for which there are a greater number of users having the authority to use (hereafter, referred to as authorized users) than the number of users not having the authority (hereafter, referred to as unauthorized users). The third mode may be if the target of the batch download corresponds to an application program for which there are a greater number of unauthorized users than the number of authorized users. Then, the setting file FIA indicates which of the first mode, the second mode, and the third mode is set for the setting items related to the download mode. That is, the setting file FIA corresponds to the mode data. An area of the auxiliary storage unit 12 that stores the setting file FIA corresponds to a second storage unit or a second memory. The setting file FIA is determined in advance by the designer or the like of the multifunction device 1, for example, and is written to the auxiliary storage unit 12 by the processor 10 or a writing machine at the time of manufacturing or shipping the multifunction device 1. The setting file FIA is also written to the auxiliary storage unit 12 by the processor 10 in accordance with the operation of a serviceman or the like at the start of use or maintenance of the multifunction device 1. Further, the setting file FIA is appropriately rewritten by the processor 10 in response to an instruction generated by an operation on the operation and display unit 13 by an administrator of the multifunction device 1.

Next, the operation of the multifunction device 1 configured as described above will be described. The description of the processes provided below are examples, and it is possible to change the order of some processes, omit some processes, add another process, and the like as appropriate.

The multifunction device 1 is operated to implement various functions of a copier, a scanner, a printer, a facsimile machine, and the like. Since this operation may be the same as the operation of the other multifunction devices of the same type, a detailed description thereof will be omitted. The characteristic operation of the multifunction device 1 is an operation for installing an application program provided by the cloud server 2, and accordingly, this operation will be described below.

The processor 10 starts a batch download process based on the installation program PRA at a predetermined batch download timing. The batch download timing may be freely determined by the designer, the administrator, or the like of the multifunction device 1. For example, it is assumed that the batch download timing is set as a timing at which the power of the multifunction device 1 is turned on and the start-up of the operation of the multifunction device 1 is completed. Alternatively, it is assumed that the batch download timing is set as a timing at which the date and time information output by the hardware clock 17 matches a set condition such as "1 AM on the first day of every month", for example.

Figure 3:
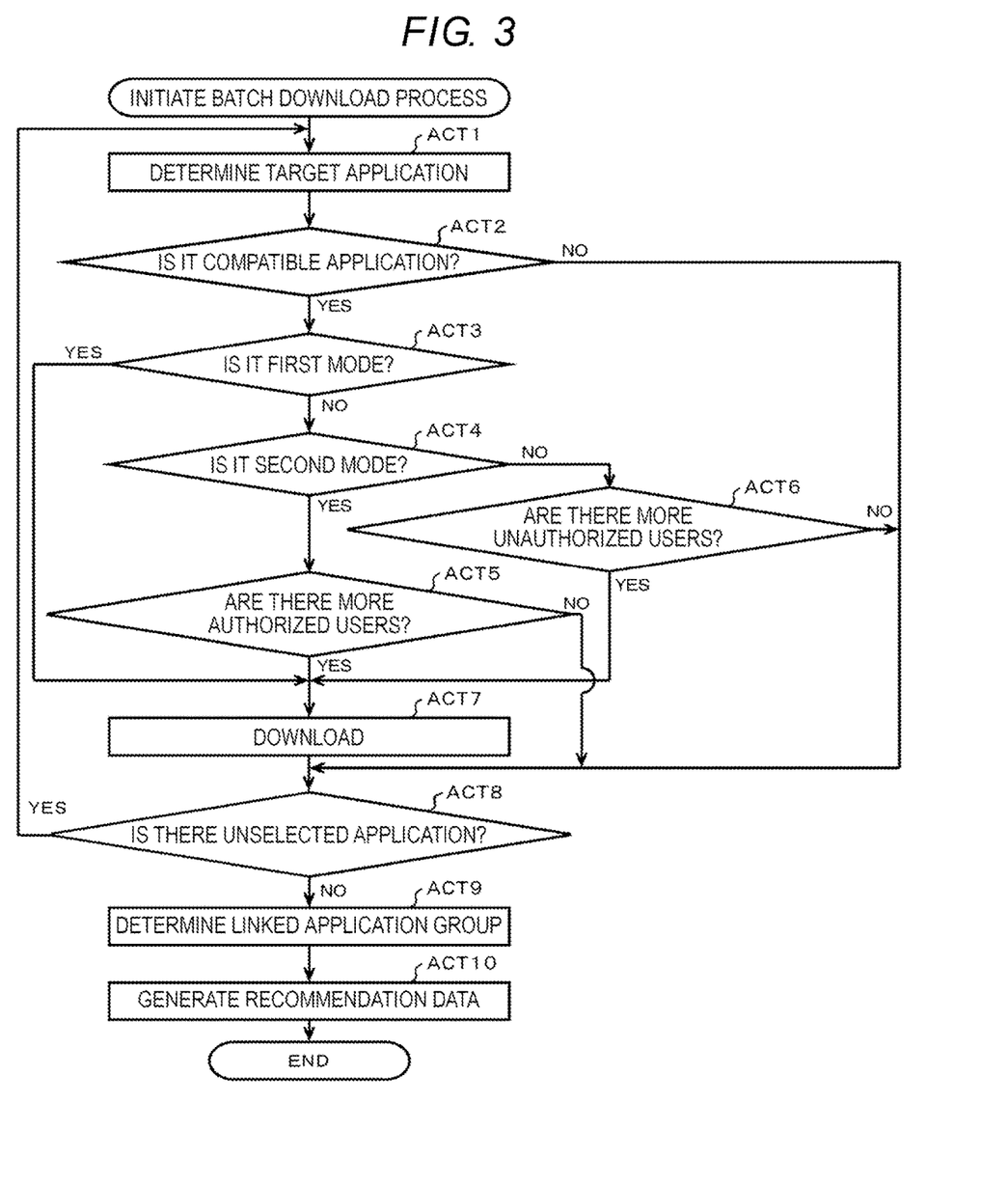
FIG. 3 is a flowchart illustrating a processing procedure of a batch download process.

FIG. 3 is a flowchart illustrating a processing procedure of the processor 10 in the batch download process.

In ACT 1, the processor 10 determines one of the application programs provided by the cloud server 2 as a target application.

In ACT 2, the processor 10 confirms whether or not the target application is an application program compatible with the multifunction device 1. That is, the application programs may correspond to specific models or the like, and may include an application program that is compatible and an application program that is not compatible with the multifunction device 1. Therefore, for example, the processor 10 confirms whether or not the target application compatible with multifunction device 1, and confirms whether or not the target application is compatible with multifunction device 1. When the processor 10 is compatible, the processor 10 determines YES and proceeds to ACT 3.

In ACT 3, the processor 10 confirms whether or not the download mode is set to the first mode. The processor 10 confirms the setting data included in the setting file FIA for the download mode, for example. Then, if the first mode is set, the processor 10 determines YES and proceeds to ACT 7. When the first mode is not set, the processor 10 determines NO in ACT 3 and proceeds to ACT 4.

In ACT 4, the processor 10 confirms whether or not the download mode is set to the second mode. Then, if the second mode is set, the processor 10 determines YES and proceeds to ACT 5.

In ACT 5, the processor 10 confirms whether or not the number of authorized users is greater than the number of unauthorized users. The processor 10 counts the number of authorized users as the number of data records REA in which the authority code of authority matching the authority to use the target application is set in the field FAB, for example. Further, the processor 10 counts the number of unauthorized users as the number of data records REA in which the authority code of authority not matching the authority used for the target application is set in the field FAB, for example. Then, if the relationship [the number of authorized users>the number of unauthorized users] is established, the processor 10 determines that there are a greater number of authorized users, determines YES in ACT 5, and proceeds to ACT 7. In addition, the processor 10 may determine that there are a greater number of authorized users, if the relationship [the number of authorized users≥the number of unauthorized users] is established.

When the second mode is not set, the processor 10 determines NO in ACT 4 and proceeds to ACT 6. That is, the processor 10 proceeds to ACT 6 if the third mode is set. In ACT 6, the processor 10 confirms whether or not the number of unauthorized users is greater than the number of authorized users. The processor 10 counts the number of authorized users and the number of unauthorized users, respectively, in the same manner as in the case of ACT 5, for example. Then, if the relationship [the number of unauthorized users>the number of authorized users] is established, the processor 10 determines that there are a greater number of unauthorized users, determines YES in ACT 6, and proceeds to ACT 7. The processor 10 may determine that there are a greater number of authorized users, if the relationship [the number of unauthorized users≥the number of authorized users] is established.

As described above, the processor 10 proceeds to ACT 7 if the first mode is set as the download mode, or if the second mode is set and there are more authorized users, or if the third mode is set and there are more unauthorized users. In ACT 7, the processor 10 downloads the target application from the cloud server 2 via the communication network 3. At this time, in practice, a package file, which packages an installation file related to the target application and additional data, is transmitted from the cloud server 2 to the multifunction device 1. The additional data represents various information related to the application program but is not required for the installation process of the application program. The additional data may indicate any information. For example, the additional data may indicate an allowable authority for a function implemented based on the application program. For example, if the function implemented based on the application program can be linked with a function implemented based on another application program, the additional data may indicate information for identifying the application program that can be linked. For example, the additional data may indicate a text message, an image, and the like for guiding the user to the function implemented based on the application program. The package file may be encrypted in many cases. When the package file transmitted by the communication network 3 is received by the communication unit 18, the processor 10 stores the package file in the application group area ARA. At this time, if the package file is encrypted, the processor 10 may store the package file as encrypted, or may decrypt and then store the package file.

Then, if the processor 10 completes downloading the target application, the processor 10 proceeds to ACT 8. Thus, if the processor 10 executes information processing based on the installation program PRA, the computer including the processor 10 as a central part serves as a download unit. The application group area ARA corresponds to the first storage unit or first memory.

When the target application is not an application program compatible with the multifunction device 1, the processor 10 determines NO in ACT 2 and proceeds to ACT 8 without executing ACT 7. When the second mode is set as the download mode and the number of authorized users is not greater than the number of unauthorized users, the processor 10 determines NO in ACT 5 and proceeds to ACT 8 without executing ACT 7. When the third mode is set as the download mode and the number of unauthorized users is not greater than the number of authorized users, the processor 10 determines NO in ACT 6 and proceeds to ACT 8 without executing ACT 7. That is, the processor 10 does not download the target application in these cases.

In ACT 8, the processor 10 is provided by the cloud server 2, and confirms whether or not there is an unselected application program as the target application. Then, if there is the corresponding application program, the processor 10 determines YES and repeats ACT 1 and the subsequent operations in the same manner as described above. However, in ACT 1, the processor 10 at this time newly determines, as the target application, an application program that has not yet been determined as the target application in the batch download process. Further, in ACT 7, the processor 10 at this time leaves the package file already stored in the application group area ARA in the batch download process as it is, and stores the newly received package file in the application group area ARA. Thus, the processor 10 repeats ACT 1 to ACT 8 while sequentially setting the application program provided by the cloud server 2 as the target application. As a result, the processor 10 stores in the application group area ARA the package file related to the application program that is compatible with the multifunction device 1 and that matches the conditions according to the mode set as the download mode.

When all the application programs provided by the cloud server 2 are completely determined as the target applications, as the processor 10 proceeds to ACT 8, the processor 10 determines NO and proceeds to ACT 9. In ACT 9, the processor 10 determines a linked application group from among the application programs (hereinafter, referred to as downloaded applications) related to the package file stored in the application group area ARA. The linked application group is a group of a plurality of downloaded applications implementing functions that can be linked. For example, one of the downloaded applications may be a first application that implements a function of reading a document and creating an image file. Further, for example, another one of the downloaded applications may be a second application that implements a function of transmitting any file to the cloud. When a function of reading a document and transmitting a created image file to the cloud can be implemented by linking the above two functions, the processor 10 determines a linked application group including the first application and the second application. When a plurality of linked application groups can be established, the processor 10 determines them respectively. For example, the processor 10 determines which combination of the downloaded applications forms the linked application group, based on the additional data included in each package file. Alternatively, the processor 10 may determine this by referring to a separate data table or the like that describes the possibility of linkage of each application program. When the linkage of the function of the already installed application program and the function of the downloaded application can be established, the processor 10 may also determine these as the linked application group.

In ACT 10, the processor 10 generates recommendation data. The recommendation data is data for recommending the downloaded application to the user. It is assumed that the recommendation data is screen data showing a recommendation screen for recommending the downloaded application, for example. It is assumed that the screen data is an HTML file, for example. For example, the processor 10 generates a recommendation screen as a screen showing the information represented by the additional data included in the package file stored in the application group area ARA in a predetermined format. For example, the processor 10 generates the recommendation screen as a screen for guiding the user regarding the linked application group. The format of the recommendation screen and the information displayed on the recommendation screen may be freely determined by the designer, the administrator, or the like of the multifunction device 1. The processor 10 stores the generated recommendation data in the recommendation data area ARB. Then, the processor 10 ends the batch download process.

Figure 4:
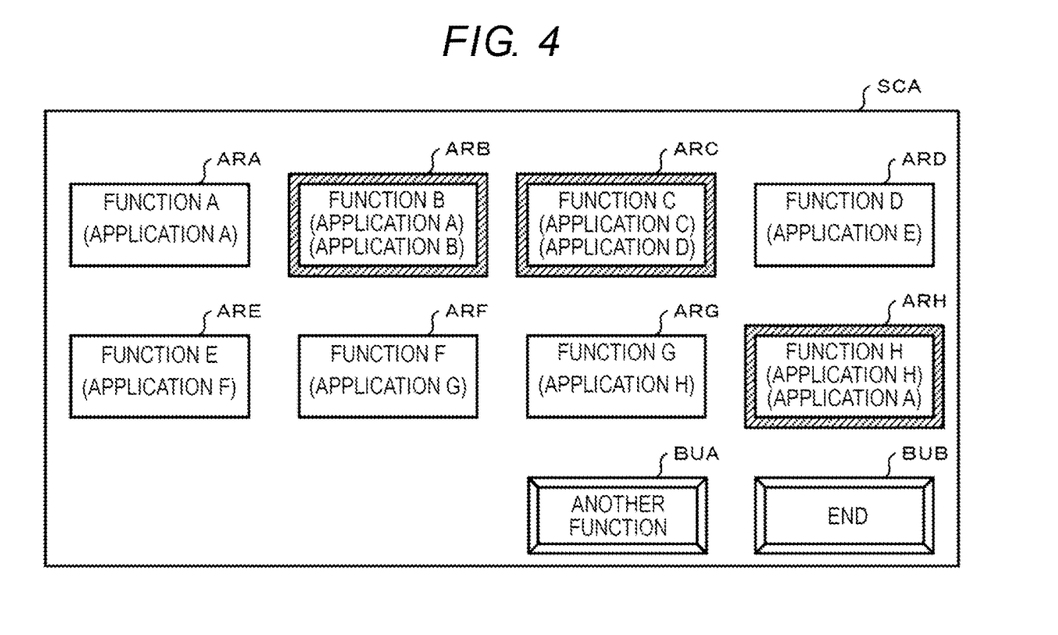
FIG. 4 is a diagram illustrating a recommendation screen as an example.

FIG. 4 is a diagram illustrating a recommendation screen SCA as an example. The recommendation screen SCA illustrated in FIG. 4 illustrates an example where eight functions can be implemented by installing a downloaded application.

The recommendation screen SCA is configured to recommend eight implementable functions in the areas ARA, ARB, ARC, ARD, ARE, ARF, ARG, and ARH, respectively. For example, the area ARA recommends that "Function A" can be used by installing "Application A". Further, for example, the area ARB recommends that "Function B" can be used by installing "Application A" and "Application B" which are the applications that form a linked application group. The border lines added to the areas ARB, ARC, and ARH are provided to highlight that the corresponding areas are recommending the linked application group. It is to be noted that the indications such as "Application A", "Function B", and the like in FIG. 4 are for the purpose of schematic illustration, and in practice, these preferably represent the names or the like that are easily understood by the operator. In addition, a character message explaining various functions may be displayed in each area. The areas ARA, ARB, ARC, ARD, ARE, ARF, ARG, and ARH are also graphical user interface (GUI) elements for the operator to specify the functions associated with the same.

A button BUA is a GUI element provided for the operator to instruct a transition to confirm the function based on the application program different from the application program recommended on the recommendation screen SCA. A button BUB is a GUI element for the operator to instruct to cancel the installation of the application.

When the operator of the multifunction device 1 wants to install the application program provided by the cloud server 2, the operator instructs to start the installation process with a predetermined operation with respect to the operation and display unit 13, for example. Then, the processor 10 starts the installation process based on the installation program PRA.

Figure 5:
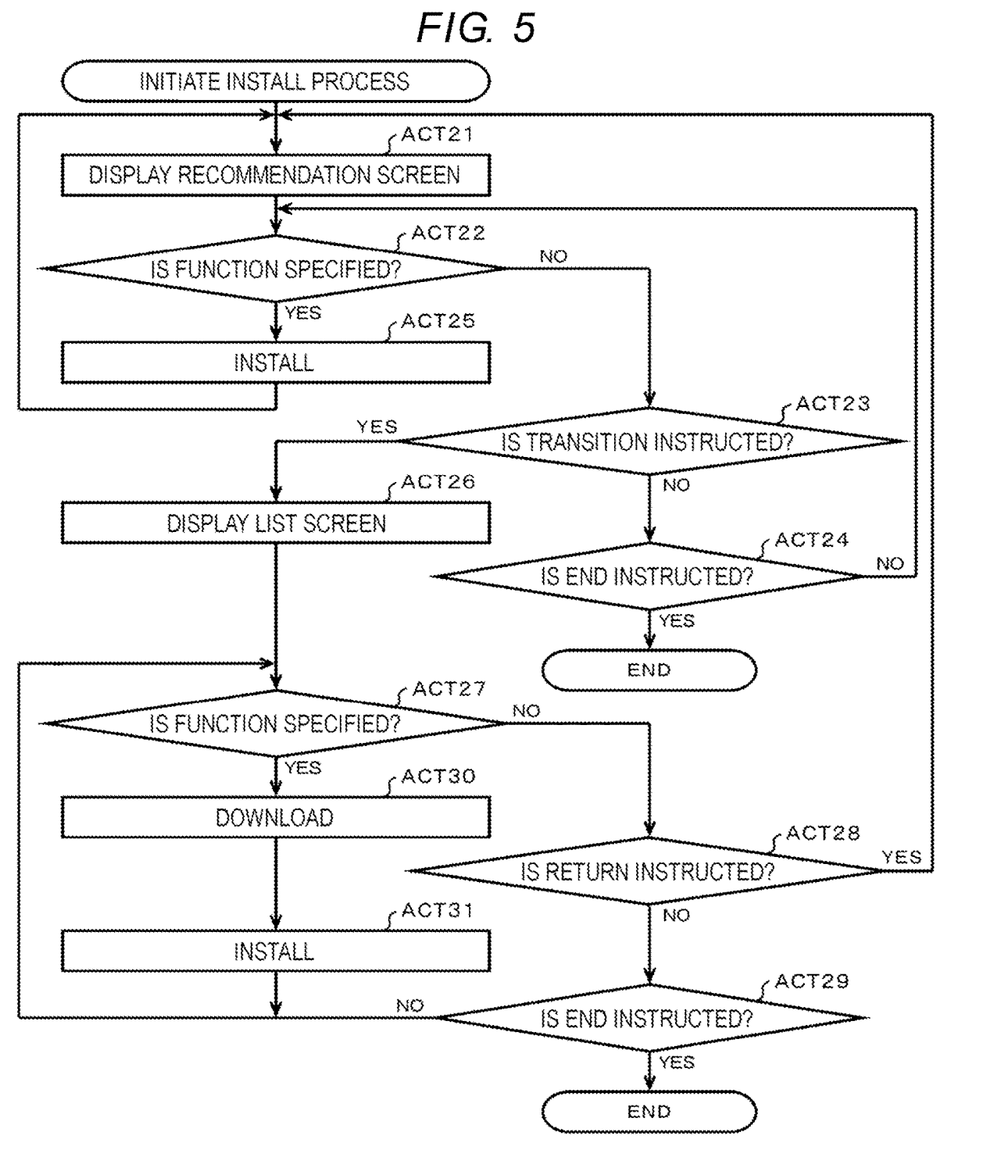
FIG. 5 is a flowchart illustrating a processing procedure of an installation process.

FIG. 5 is a flowchart illustrating the processing procedure of the processor 10 in the installation process.

In ACT 21, the processor 10 displays a recommendation screen (e.g., the recommendation screen SCA). For example, the processor 10 causes the operation and display unit 13 to display a recommendation screen represented by the recommendation data stored in the recommendation data area ARB. However, for example, the processor 10 may cause a display device (not illustrated) externally attached to the multifunction device 1 to display the recommendation screen. Further, the processor 10 may create the recommendation data as the data for generating the recommendation screen in ACT 10 in FIG. 3, and generate the recommendation screen. Thus, if the processor 10 executes information processing based on the installation program PRA, the computer including the processor 10 as a central part serves as a recommendation unit.

In ACT 22, the processor 10 confirms whether or not the recommended function is specified on the recommendation screen (e.g., via the selection of one or more of the areas ARA, ARB, ARC, ARD, ARE, ARF, ARG, and ARH). Then, if the corresponding event cannot be confirmed, the processor 10 determines NO and proceeds to ACT 23.

In ACT 23, the processor 10 confirms whether or not it is instructed to transition (e.g., via the button BUA) to confirm the function based on the application program different from the application program recommended on the recommendation screen. Then, if the corresponding event cannot be confirmed, the processor 10 determines NO and proceeds to ACT 24.

In ACT 24, the processor 10 confirms whether or not it is instructed to end the installation (e.g., via the button BUB). Then, if the corresponding event cannot be confirmed, the processor 10 determines NO and returns to ACT 22.

Thus, in ACT 22 to ACT 24, the processor 10 waits for any of the instruction to specify the function, the instruction to transit to confirm another function, or the instruction to end to be given.

When the operator determines to add the function recommended on the recommendation screen, the operator specifies the desired function with a predetermined operation such as touching or the like, with respect to the area related to the function. In response to this, the processor 10 determines YES in ACT 22 and proceeds to ACT 25.

In ACT 25, the processor 10 installs the application program to implement the specified function. For example, the processor 10 searches for a package file related to the corresponding application program from the package files stored in the application group area ARA. The processor 10 decrypts the corresponding package file if encrypted. Then, the processor 10 executes the installation based on the installation file included in the corresponding package file. When the function implemented specifies a linked application group, the processor 10 installs a plurality of application programs included in the linked application group, respectively. Then, after completing all the necessary installations, the processor 10 returns to ACT 21 and executes the subsequent processes in the same manner as described above. Thus, if the processor 10 executes information processing based on the installation program PRA, the computer including the processor 10 as a central part serves as an installation unit.

When the operator wants to confirm a function based on an application program different from the application program recommended on the recommendation screen, the operator instructs so, with a predetermined operation such as touching or the like with respect to the button BUA on the recommendation screen. In response to this, the processor 10 determines YES in ACT 23 and proceeds to ACT 26.

In ACT 26, the processor 10 displays a list screen. The list screen is a screen showing a list of functions provided by the application program provided by the cloud server 2. The processor 10 causes the operation and display unit 13 to display the list screen based on the screen data provided by the cloud server 2, for example. However, for example, the processor 10 may cause a display device (not illustrated) externally attached to the multifunction device 1 to display the list screen. The processor 10 may acquire list data of functions or application programs from the cloud server 2 and generate the list screen based on the list data. The processor 10 may or may not display the application program downloaded in ACT 7 on the list screen.

In ACT 27, the processor 10 confirms whether or not the function displayed on the list screen is specified. Then, if the corresponding event cannot be confirmed, the processor 10 determines NO and proceeds to ACT 28.

In ACT 28, the processor 10 confirms whether or not it is instructed to return to the recommendation screen. Then, if the corresponding event cannot be confirmed, the processor 10 determines NO and proceeds to ACT 29.

In ACT 29, the processor 10 confirms whether or not it is instructed to end the installation. Then, if the corresponding event cannot be confirmed, the processor 10 determines NO and returns to ACT 27.

Thus, In ACT 27 to ACT 29, the processor 10 waits for any of the instruction to specify a function, the instruction to return, or the instruction to end to be given.

When the operator determines to add the function displayed on the list screen, the operator specifies the desired function with a predetermined operation such as a touch operation or the like with respect to the list screen. In response to this, the processor 10 determines YES in ACT 27, and proceeds to ACT 30.

In ACT 30, the processor 10 downloads a package file related to the specified function from the cloud server 2. When the application program downloaded in ACT 7 is not displayed on the list screen, since the package file of the application program related to the specified function was not downloaded in ACT 7, the processor 10 executes ACT 30 as illustrated in FIG. 5. However, if the application program for which the package file was downloaded in ACT 7 is displayed on the list screen, the processor 10 may confirm whether or not the package file of the application program related to the specified function was downloaded in ACT 7, and if it was downloaded, the processor 10 may pass ACT 30 and proceed to ACT 31.

In ACT 31, the processor 10 executes the installation based on the installation file included in the downloaded package file. At this time, if the downloaded package file is encrypted, the processor 10 decrypts the encrypted file prior to the installation. When the processor 10 passes ACT 30 as described above, the processor 10 executes the installation based on the installation file included in the package file stored in the application group area ARA, as in ACT 25. Then, if the installation is completed, the processor 10 returns to the standby state of ACT 27 to ACT 29.

When the operator wants to return the screen to the recommendation screen, the operator instructs so, with a predetermined operation such as a touch operation or the like into the list screen. In response to this, the processor 10 determines YES in ACT 28, returns to ACT 21, and repeats the subsequent processes in the same manner as described above.

When the operator wants to finish the installation, the operator instructs to end, with a predetermined operation such as pressing or the like with respect to the button BUB on the recommendation screen. In response to this, the processor 10 determines YES in ACT 24 and ends the installation process.

When the operator wants to finish the installation, the operator instructs to end, with a predetermined operation such as a touch operation or the like into the list screen. In response to this, the processor 10 determines YES in ACT 29 and ends the installation process.

As described above, the multifunction device 1 collectively downloads the package files including the installation files related to each of the plurality of application programs at a predetermined download timing, and stores the downloaded files in the application group area ARA of the auxiliary storage unit 12. Then, if it is necessary to install the application program related to the package file stored as described above, the installation is performed using the installation file included in the stored package file. Therefore, it is not necessary to download the application program related to the stored package file if the need arises, and the installation can be performed more efficiently than the case of downloading one by one.

When the second mode or the third mode is set as the download mode, the multifunction device 1 collectively downloads only the package files related to the application programs that match the respective conditions and stores the downloaded files in the application group area ARA. Therefore, the amount of data to be downloaded and stored can be reduced as compared with the case where the first mode is set and all the application programs are downloaded.

Further, if the second mode is set as the download mode, the multifunction device 1 determines, as the target of batch download, the application programs for which there are a greater number of authorized users than the number of unauthorized users. Since there are greater number of users who can use the application program that matches such conditions, there is a high possibility that it will be installed, and it is possible to sufficiently obtain the effect of batch download.

Further, if the third mode is set as the download mode, the multifunction device 1 determines, as target of batch download, the application programs for which there are greater number of unauthorized users than the number of authorized users. Since the number of users who can use the application programs that match such conditions is small, the application programs are often left uninstalled even though the application programs have useful functions. However, if the third mode is set in the multifunction device 1, since such application programs are recommended, the chance of installing the corresponding application program can be increased.

Then, since the user or the like of the multifunction device 1 can appropriately use the first mode, the second mode, and the third mode, the multifunction device 1 can be flexibly operated according to the needs of the user.

The embodiment may be modified in various ways as follows.

The download mode may be only one or two of the first mode, the second mode, and the third mode. Further, the download mode may be set to at least one mode that determines the application program to be downloaded under conditions different from all of the first mode, the second mode, and the third mode.

The embodiment can be implemented in the same manner in any device other than the multifunction device 1, such as an image forming apparatus and the like, as long as the function can be changed by installing an application program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A device comprising:
a memory; and
a processor configured to:
   download a plurality of installation files for a plurality of application programs provided on a website at a predetermined download timing;
   store the plurality of installation files in the memory;
   provide a recommendation graphical user interface (GUI) based on the plurality of installation files stored in the memory at a predetermined recommendation timing different than the predetermined download timing, the recommendation GUI displaying a plurality of GUI elements, each of the plurality of GUI elements associated with one of a plurality of functions, each of the plurality of functions addable by installing one or more application programs of the plurality of application programs using the plurality of installation files, a first function of the plurality of functions based on a single application program of the plurality of application programs, a first GUI element of the plurality of GUI elements associated with the first function and has a first visual appearance, a second function of the plurality of functions based on two application programs of the plurality of application programs of the plurality of application programs, a second GUI element of the plurality of GUI elements associated with the second function and has a second, different visual appearance than the first GUI element;
   receive a selection of a respective function of the plurality of functions; and
   add the respective function by installing one or more of the plurality of installation files for the one or more application programs associated with the respective function.

2. The device of claim 1, wherein the second GUI element has a border and the first GUI element does not have a border.

3. The device of claim 1, wherein the second, different visual appearance highlights or indicates that the second GUI element represents a function that is based on two application programs and not a function based on a single application program.

4. The device of claim 1, wherein the device is a multi-function peripheral.

5. The device of claim 1, wherein the processor is configured to download all installation files provided on the website that are related to application programs that can be used by an image forming apparatus.

6. The device of claim 5, wherein the memory is configured to store mode data indicating a mode determined to be applied among a plurality of modes related to downloading the plurality of installation files, wherein, if the mode data stored indicates a first mode, the processor is configured to download all installation files provided on the website that are related to the application programs that can be used by the image forming apparatus.

7. The device of claim 1, wherein the memory is configured to store authority data indicating an authority of each of a plurality of users, wherein each of the plurality of installation files provided on the website has an allowable authority defined as a user authority to allow use of a function implemented by an application program, and wherein, if a number of authorities indicated by the authority data stored in the memory matching the allowable authority for a respective installation file is greater than a number of non-matching authorities, the processor is configured to determine that the respective installation file is a download target.

8. The device of claim 7, wherein the memory is configured to store mode data indicating a mode determined to be applied among a plurality of modes related to downloading the plurality of installation files, wherein, if the mode data stored by the memory indicates a second mode, and if the number of authorities indicated by the authority data stored in the memory matching the allowable authority for the respective installation file is greater than the number of non-matching authorities, the processor is configured to determine that the respective installation file is the download target.

9. The device of claim 1, wherein the memory is configured to store authority data indicating an authority of each of a plurality of users, wherein each of the plurality of installation files provided on the website has an allowable authority defined as a user authority to allow use of a function implemented by an application program, and wherein, if a number of authorities indicated by the authority data stored in the memory matching the allowable authority for a respective installation file is less than a number of non-matching authorities, the processor is configured to determine that the respective installation file is a download target.

10. The device of claim 9, wherein the memory is configured to store mode data indicating a mode determined to be applied among a plurality of modes related to downloading the plurality of installation files, wherein, if the mode data stored by the memory indicates a third mode, and if the number of authorities indicated by the authority data stored in the memory matching the allowable authority for the respective installation file is less than the number of non-matching authorities, the processor is configured to determine that the respective installation file is the download target.

11. The device of claim 1, further comprising a display, wherein the processor is configured to provide the recommendation GUI on the display.

12. A device comprising:
a memory; and
a processor configured to:
   download a plurality of installation files for a plurality of application programs; and
   provide a recommendation graphical user interface (GUI) based on the plurality of installation files, the recommendation GUI displaying a plurality of GUI elements, each of the plurality of GUI elements associated with one of a plurality of functions, each of the plurality of functions addable by installing one or more application programs of the plurality of application programs using the plurality of installation files, a first function of the plurality of functions based on a single application program of the plurality of application programs, a first GUI element of the plurality of GUI elements associated with the first function and has a first visual appearance, a second function of the plurality of functions based on two application programs of the plurality of application programs of the plurality of application programs, a second GUI element of the plurality of GUI elements associated with the second function and has a second, different visual appearance than the first GUI element.

13. The device of claim 12, wherein the second GUI element has a border and the first GUI element does not have a border.

14. The device of claim 12, wherein the second, different visual appearance highlights or indicates that the second GUI element represents a function that is based on two application programs and not a function based on a single application program.

15. The device of claim 12, wherein the device is a multifunction peripheral.

16. The device of claim 12, further comprising a display, wherein the processor is configured to provide the recommendation GUI on the display.

17. A method comprising:
   downloading, by a processor, a plurality of installation files for a plurality of application programs provided on a website at a predetermined download timing;
   storing, by the processor, the plurality of installation files in a memory; and
   displaying, by the processor on a display, a recommendation graphical user interface (GUI) based on the plurality of installation files stored in the memory at a predetermined recommendation timing different than the predetermined download timing, the recommendation GUI displaying a plurality of GUI elements, each of the plurality of GUI elements associated with one of a plurality of functions, each of the plurality of functions addable by installing one or more application programs of the plurality of application programs using the plurality of installation files, a first function of the plurality of functions based on a single application program of the plurality of application programs, a first GUI element of the plurality of GUI elements associated with the first function and has a first visual appearance, a second function of the plurality of functions based on two application programs of the plurality of application programs of the plurality of application programs, a second GUI element of the plurality of GUI elements associated with the second function and has a second, different visual appearance than the first GUI element.

18. The method of claim 17, further comprising:
   receiving, by the processor, a selection of a respective function of the plurality of functions; and
   adding, by the processor, the respective function by installing one or more of the plurality of installation files for the one or more application programs associated with the respective function.

19. The method of claim 17, wherein the second GUI element has a border and the first GUI element does not have a border.

20. The method of claim 17, wherein the second, different visual appearance highlights or indicates that the second GUI element represents a function that is based on two application programs and not a function based on a single application program.

* * * * *